(No Model.)
D. E. CRIPE.
CULINARY UTENSIL.
No. 568,664. Patented Sept. 29, 1896.
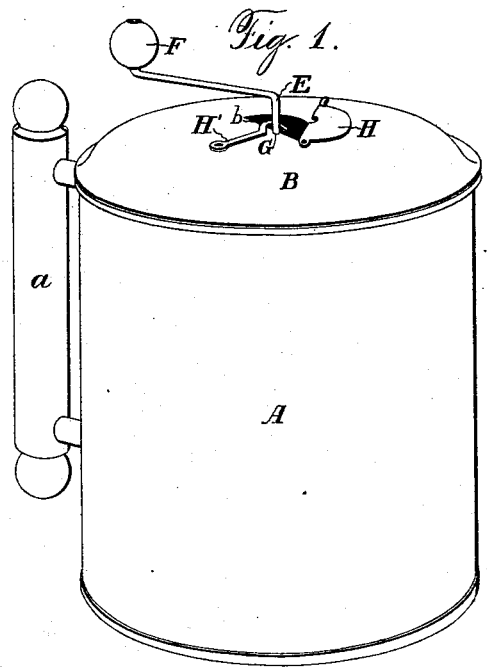
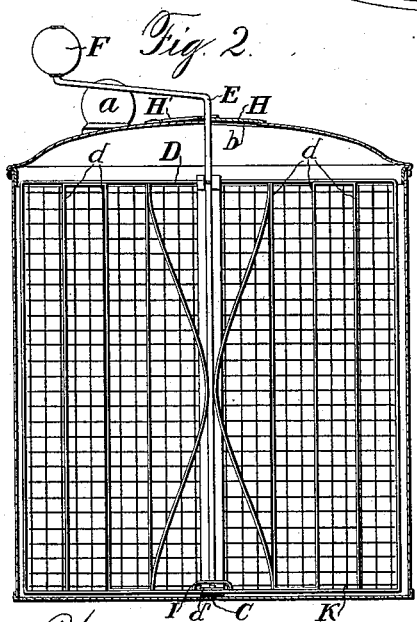
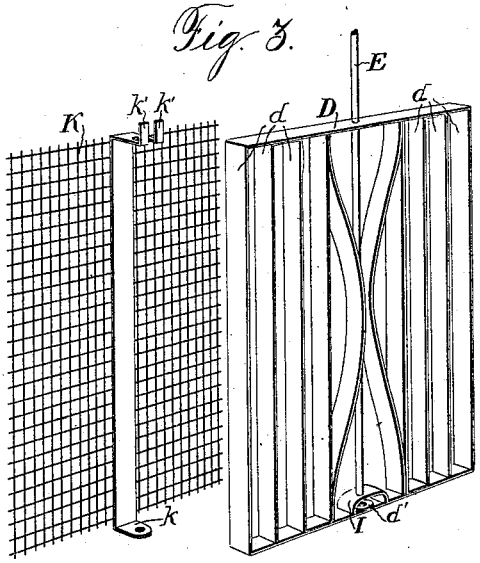
Witnesses:
Frank S. Prindle
Henry C. Hazard
Inventor
Daniel E. Cripe, by
Prindle and Russell, his Attys

UNITED STATES PATENT OFFICE.

DANIEL E. CRIPE, OF FRANKFORT, INDIANA.

CULINARY UTENSIL.

SPECIFICATION forming part of Letters Patent No. 568,664, dated September 29, 1896.

Application filed November 21, 1895. Serial No. 569,674. (No model.)

*To all whom it may concern:*

Be it known that I, DANIEL E. CRIPE, of Frankfort, in the county of Clinton, and in the State of Indiana, have invented certain new and useful Improvements in Culinary Utensils; and I do hereby declare that the following is a full, clear, and exact description thereof, reference being had to the accompanying drawings, in which—

Figure 1 is a perspective view of my utensil; Fig. 2, a vertical section thereof, and Fig. 3 is a detail perspective view of the mixer and beater separated from each other.

Letters of like name and kind refer to like parts in each of the figures.

The object of my invention is to provide a culinary utensil of simple construction which will be adapted for the various uses of cooking or stewing fruit and other articles, stirring the same, mixing cake-dough, and beating eggs; and to this end said invention consists in the culinary utensil constructed substantially as and for the purpose hereinafter specified.

In the carrying of my invention into practice I employ a circular metal vessel or receptacle A, adapted for use in cooking, provided with a removable cover B and a suitable handle $a$.

On the bottom of the vessel A, at its center, is a stud or pintle C, that journals the lower end of a stirrer or mixer D for fruit, cake, &c., from the upper end of which projects a shaft E, that passes through an opening $b$ in the cover B and above the latter is bent to form an operating crank or handle F. Adjacent to the opening $b$ is a semicircular-shaped opening G, of such size as to permit the passage of the handle or crank F when it is desired to remove the cover, which opening G is adapted to be closed by a hinged cover H, that is notched in its straight edge to receive the shaft E. The latter is held from moving laterally out of the opening $b$ by means of a hook H', that is pivoted to the upper side of the cover, so as to be adapted to be swung into and out of engagement with the shaft.

The stirrer or mixer D consists of a rectangular frame having on each side of its axis a number of vertical blades or bars $d$, several of which are straight and extend parallel with each other, while the innermost one is preferably curved or bowed inwardly toward the shaft E. The lower horizontal part of the frame is provided at its center with an opening $d'$ to engage the pintle C, and arching over the latter is a curved plate I, to the upper side of which the lower end of the shaft E is attached.

Articles requiring to be stirred or mixed may be placed in the vessel A simply for this purpose, or if they require previous cooking they may be cooked therein, and of course they may be stirred while cooking when such is necessary.

For beating eggs I employ a beater K, that consists of a rectangular piece of wire-cloth of substantially the same size as the frame of the stirrer D, which at its lower end has a horizontal lug $k$, that is perforated to fit over the pintle C, and at its upper end two parallel fingers $k'\,k'$, that extend on opposite sides of the shaft E horizontally beneath the upper horizontal member of said frame and then upward a short distance past the same. The egg-beater is thus firmly held to and is caused to rotate with the stirrer D, but at the same time is easily detached therefrom when it is desired to use only the stirrer or restored to place when eggs are to be beaten. The presence of the stirrer in no degree impairs the efficiency of the egg-beater, but is rather a help, and thus no substitution or interchange of parts is required, it being necessary to simply connect the one removably to the other, which is a fixture on the shaft.

My utensil is very simple, and yet affords means for satisfactorily doing a variety of operations in household-work.

Having thus described my invention, what I claim is—

1. In a culinary utensil, the combination of the vessel, a rotary shaft carrying two appliances as a stirrer and beater, one of which is connected with the shaft and means detachably connecting said appliances, substantially as and for the purpose specified.

2. In a culinary utensil, the combination of the vessel, a rotary shaft, a stirrer connected therewith, and an egg-beater removably attached to the face of the stirrer, substantially as and for the purpose shown.

3. In a culinary utensil, the combination of the vessel, having a pintle on its bottom, the stirrer, journaled on the pintle, a shaft to which the stirrer is attached, having a suitable operating-handle, and an egg-beater having a perforated lug engaging the pintle, and fingers passing upon opposite sides of the shaft and engaging the stirrer, substantially as and for the purpose set forth.

In testimony that I claim the foregoing I have hereunto set my hand this 30th day of October, 1895.

DANIEL E. CRIPE.

Witnesses:
ABE MILLS,
MARK BARNES.